Figure 1:
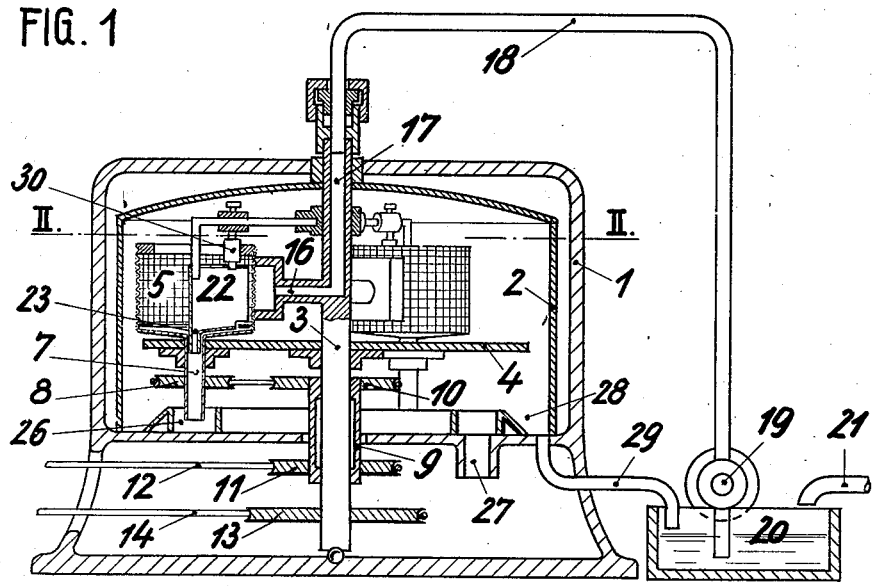

Nov. 17, 1936.   R. ADAMS   2,061,340
SIFTING, STRAINING, OR FILTERING APPARATUS
Filed May 22, 1935

Inventor
Robert Adams
By Sommers & Young
Attys

Patented Nov. 17, 1936

2,061,340

UNITED STATES PATENT OFFICE 2,061,340

SIFTING, STRAINING, OR FILTERING APPARATUS

Robert Adams, Bad Kreuznach, Germany, assignor to Seitz-Werke G. m. b. H., Rheinland, Germany Application May 22, 1935, Serial No. 22,897
In Germany June 27, 1933

12 Claims. (Cl. 210—63)

The invention relates to a sieve, straining or filtering arrangement in which use is made of centrifugal force. The arrangement can be utilized for straining or filtering any liquid and is particularly suitable for removing impurities such as membranes and the like from dyeing liquors which require an extremely fine straining or filtering. If desired, the arrangement could be employed for sifting solid pulverulent material.

The arrangement consists of a series of individual sieve drums of cylindrical construction with a peripheral sieve or filter layer. Such arrangements are known per se. Normally the liquid passes into the interior of the individual drums and is forced outwardly through the sieve wall by the centrifugal action. With such an arrangement the solid particles to be separated from the liquid being filtered are deposited on the sieve wall within the drum and are difficult to remove. It has also been proposed to introduce the liquid to be filtered into the sieve drum through the sieve. In this arrangement the axis of the sieve drum is horizontal and the solid particles are intended to be thrown off over a partion whereas beneath it the liquid re-emerges from the sieve drum through the filter layer and has to be led off. It is not possible however to effect a definite separation of solid and liquid components and there is the risk of remixing, which renders the entire arrangement unsuitable more particularly for straining or filtering dyeing liquors.

In contradistinction to this known arrangement, according to the present invention the arrangement is such that within each drum immediately behind the inlet for the liquid is a collecting chamber into which the filtrate passes and from which it is directed to a common collecting trough. In this way it is attained that solid components remain on the outer wall of the sieve and can conveniently be removed without risk of re-mixing with the filtrate.

In order that the sieve drums should bear firmly against the boxes through which the liquid is introduced, a supporting roller is provided for each sieve drum which engages against the upper inner edge of the sieve drum and urges the latter against the corresponding box. A recess is preferably provided on this edge engaged by the supporting roller so that at this point the pressure of the supporting roller is withdrawn and the collected residues can emerge from the box. Alternatively, the external wall of the drum may be provided with a depression through which the collected residues are discharged from the box. If the sieve or filter cloth is pressed into this depression the latter also enables the cloth to be tightened.

Figure 2:
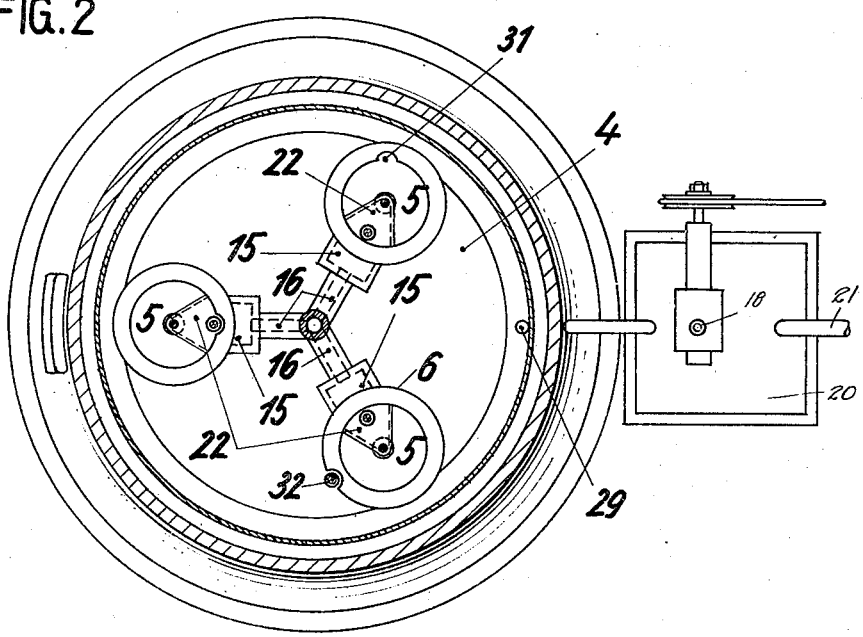

One embodiment of the arrangement according to the present invention is shown by way of example in the accompanying drawing in which:

Fig. 1 is a longitudinal section,
Fig. 2 is a top view in partial section.

Disposed within the housing 1 is a stationary cowl 2 in the centre of which is a rotary shaft 3. The individual sieve drums 5, three being shown in the drawing, are carried on this shaft on a support 4. Each sieve drum 5 is contructed as a cylindrical vessel and carries on its apertured peripheral surface the sieve cloth or filter layer 6. Each drum 5 is provided with a vertical shaft 7 which is driven by means of a belt 8 from the larger pulley 10 carried on the sleeve 9. The sleeve 9 carries a second pulley 11 which is driven by suitable means 12.

The shaft 3 is rotated rapidly by means of the pulley 13 and the driving means 14 whereas the shafts 7 of the individual drums 5 rotate relatively slowly.

In both cases the belt drive can of course be replaced by any other suitable drive such as a gear wheel system. Also a planetary gear wheel system can be utilized for obtaining the rotation of the individual drums about their axes.

A box 15 which is connected by means of a conduit 16 with the upper conduit 17 of the shaft 3 is positioned against the outer wall of each drum 5. By means of the pipe 18 the conduit 17 is connected with a pump 19 which pumps the liquid to be filtered from the reservoir 20. The liquid is introduced into this reservoir through the pipe 21.

Provided within each sieve drum 5 is a collecting chamber 22 for the filtrate which is disposed opposite the feed boxes 15 and which collects the liquid passing through the sieve wall. The liquid is then directed through an outlet 23 and the hollow shaft 7 into the annular collecting trough 26. From the trough 26 the liquid leaves the device at the outlet 27 in the form of a final filtrate.

Provided on the base of the housing 1 is a second trough 28 in which the solid particles thrown off from the walls of the sieves are collected and from which they are returned through the pipe 29 into the reservoir 20.

A roller 30 extends into the interior of each sieve drum 5 and holds the drum with its wall closely against the box 15.

The mode of operation of the arrangement is as follows:

The liquid to be filtered, for example a dye solution, is constantly introduced into the reservoir 20 through the pipe 21. The pump 19 draws the liquid from this reservoir and supplies it through the tube 18 to the conduit 17 in the shaft 3. The liquid is then distributed to the individual boxes 15 through the connections 16 and as these boxes together with the drums 5 are rotating rapidly with the shaft 3, the centrifugal force which may be increased by pumping or by the head of liquid forces the liquid out of the boxes 15 through the sieve wall or filter layer of the drums 5. Within the drums the filtrate is trapped by the chambers 22 and directed through outlets 23 and the hollow shafts 7 into the trough 26 and removed from the apparatus through the outlet 27.

As due to the provision of the belt drive 11, 10, and 8 each drum 5 also rotates slowly about its own axis, new parts of the wall of the filter layer 6 are constantly presented in front of the corresponding boxes 15 so that a blockage cannot occur and a good filtration or straining is always effected.

The particles retained from the filter liquid collect in part in the boxes 15 and in part remain on the filter layer and are removed from the box 15 during the rotation of the filter layer whereupon they are thrown off outwardly against the inner wall of the cowl 2 due to the centrifugal action. Here they fall to the bottom and are collected in the trough 28 extending round the base and are returned to the reservoir 20 through the tube 29.

In this way a constant filtration is effected in that new parts of the filter wall are progressively presented to the liquid stream and each wall is automatically cleaned in that the centrifugal action causes the retained particles on the outer surface of the filter to be thrown off.

In order to remove from the boxes 15 from time to time the residues collecting therein, the upper edge of each sieve drum 5 against which the roller 30 bears, can be recessed at one point as indicated at 31. When this point 31 reaches the roller 30 the roller no longer urges the drum against the box 15 and as the shaft 7 is somewhat yieldingly mounted, the drum can move outwardly slightly so that a gap occurs between the edge of the box 15 and the filter layer 6 through which the solid components can emerge, these solid components being thrown off and collected in the trough 28.

The arrangement may also be such that the recess is provided on the outer periphery of the drum 5 as indicated at 32 so that when this recess passes in front of the box 15 the solid components enter the recess and are carried along in it to the outside. This external recess 32 affords the further advantage that the sieve cloth or filter layer which passes over it can be tensioned by depressing it into the recess by means of a bar or by means of an eccentric arrangement.

What I claim is:

1. In a centrifugal device of the character described, a plurality of screen drums, means for bodily revolving said drums about a common axis of rotation, means for rotating each of said drums about its own axis, a feed box for each of said screen drums opening onto the peripheral surface thereof on the side facing the common axis of revolution, means for pressing the respective drums and feed boxes together, said feed boxes having substantial peripheral extent around the peripheries of said drums, means within each of said sieve drums forming a collection chamber for the filtrate disposed opposite each of said feed boxes and having peripheral extent as great as the feed boxes, and means for delivering a mixture to be treated to said feed boxes.

2. In an apparatus for separating a component from a mixture, a driven shaft, sieve drums carried by said shaft radially spaced therefrom, means for rotating each of said sieve drums about its own axis, a feed box for each of said drums in engagement with and opening onto the outer surface thereof on the side adjacent said shaft over substantial portions of the peripheries of said drums, means for delivering the mixture to said feed boxes, means engaging the inner periphery of said drums adjacent said feed boxes for maintaining said drums pressed against said boxes, a filtrate collecting receptacle disposed inside each of said drums directly opposite each of said feed boxes, and having as great peripheral extent as the boxes, and an outlet from each of said collecting receptacles to a common discharge duct.

3. In a centrifugal apparatus for separating at least one component from a mixture, a driven shaft, a support carried by and rotatable with said shaft, a plurality of sieve drums journalled at one end in said support and radially spaced from said shaft, means for driving each of said drums about its own axis, a feed box for each of said drums carried by said shaft, said feed boxes engaging and opening onto the outer surface of said drums at the side thereof facing said shaft, a roller engaging the inner edge of the free end of each of said drums to maintain the latter in tight engagement with said feed boxes, means for delivering the mixture to said feed boxes, means within each of said sieve drums forming a collection chamber for the filtrate disposed opposite each of said feed boxes, and means periodically spacing a portion of the wall of the drum from said feed box to release accumulated solid matter collected therein.

4. In a centrifugal apparatus for separating at least one component from a mixture, a driven shaft, a support carried by and rotatable with said shaft, a plurality of sieve drums journalled at one end in said support and radially spaced from said shaft, means for driving each of said drums about its own axis, a feed box for each of said drums carried by said shaft, said feed boxes engaging and opening onto the outer surface of said drums at the side thereof facing said shaft, a roller engaging the inner edge of the free end of each of said drums to maintain the latter in tight engagement with said feed boxes, means for delivering the mixture to said feed boxes, a filtrate collecting receptacle disposed within each of said drums directly opposite each of said feed boxes, said receptacle having side walls engaging the inner surface of said drum on either side of the filtering area defined by said feed boxes, and an outlet from each of said collecting receptacles, said drums having a recessed portion in the path of said roller for periodically releasing the drums from engagement with the feed boxes to discharge accumulated solid matter from the latter.

5. In a centrifugal apparatus for separating at least one component from a mixture, a driven shaft, a support carried by and rotatable with said shaft, a plurality of sieve drums journalled at one end in said support and radially spaced from said shaft, means for driving each of said drums about its own axis, a feed box for each of said drums carried by said shaft, said feed boxes engaging and opening onto the outer surface of said drums at the side thereof facing said shaft, a roller engaging the inner edge of the free end of each of said drums to maintain the latter in tight engagement with said feed boxes, means for delivering the mixture to said feed boxes, and a filtrate collecting receptacle disposed within each of said drums directly opposite each of said feed boxes, said receptacle having side walls engaging the inner surface of said drum on either side of the filtering area defined by said feed boxes, an outlet from each of said collecting receptacles, each of said drums having a depressed portion in its outer peripheral surface extending substantially parallel to the axis thereof for receiving and carrying off accumulated solid matter from within said feed boxes.

6. In a centrifugal device of the character described, a plurality of screen drums, means for bodily rotating said drums about a common axis of rotation, means for revolving each of said drums about its own axis, a feed box for each of said screen drums in engagement with and opening onto the peripheral surface thereof on the side facing the common axis of rotation, a filtrate collecting receptacle disposed within each of said drums directly opposite each of said feed boxes, said receptacle having side walls engaging the inner surface of said drum on either side of the filtering area defined by said feed boxes, an outlet from each of said collecting receptacles, and means periodically spacing a portion of the wall of the drum from said feed box to release accumulated solid matter collected therein.

7. In a centrifugal device of the character described, a plurality of screen drums, means for bodily rotating said drums about a common axis of rotation, means for revolving each of said drums about its own axis, a feed box for each of said screen drums in engagement with and opening onto the peripheral surface thereof on the side facing the common axis of rotation, a filtrate collecting receptacle disposed within each of said drums directly opposite each of said feed boxes, said receptacle having side walls engaging the inner surface of said drum on either side of the filtering area defined by said feed boxes, an outlet from each of said collecting receptacles, and a roller engaging the inner surface of the upper end of each of said drums to hold the latter in firm engagement with said feed boxes, said drums having a recessed portion in the path of said roller for periodically releasing the drums from engagement with the feed boxes to discharge accumulated solid matter from the latter.

8. In centrifugal device of the character described, a plurality of screen drums, means for bodily rotating said drums about a common axis of rotation, means for revolving each of said drums about its own axis, a feed box for each of said screen drums in engagement with and opening onto the peripheral surface thereof on the side facing the common axis of rotation, a filtrate collecting receptacle disposed within each of said drums directly opposite each of said feed boxes, said receptacle having side walls engaging the inner surface of said drum on either side of the filtering area defined by said feed boxes, an outlet from each of said collecting receptacles, and a roller engaging the inner surface of the upper end of each of said drums to hold the latter in firm engagement with said feed boxes, each of said drums having a depressed portion in its outer peripheral surface extending substantially parallel to the axis thereof for receiving and carrying off accumulated solid matter from within said feed boxes.

9. In an apparatus for separating at least one component from a mixture, a driven shaft, sieve drums carried by said shaft radially spaced therefrom, means for rotating each of said sieve drums about its own axis, a feed box for each of said drums in engagement with and opening onto the outer surface thereof on the side adjacent said shaft, means for delivering the mixture to said feed boxes, means engaging the inner periphery of said drums adjacent said feed boxes for maintaining said drum in engagement with the boxes, a filtrate collecting receptacle disposed inside each of said drums directly opposite each of said feed boxes, means periodically spacing a portion of the wall of the drum from said feed box to release accumulated solid matter collected therein, and an outlet from each of said collecting receptacles to a common discharge duct.

10. In an apparatus for separating at least one component from a mixture, a driven shaft, sieve drums carried by said shaft radially spaced therefrom, means for rotating each of said sieve drums about its own axis, a feed box for each of said drums in engagement with and opening onto the outer surface thereof on the side adjacent said shaft, means for delivering the mixture to said feed boxes, a filtrate collecting receptacle disposed within each of said drums directly opposite each of said feed boxes, said receptacle having side walls engaging the inner surface of said drum on either side of the filtering area defined by said feed boxes, an outlet from each of said collecting receptacles, and means periodically spacing a portion of the wall of the drum from said feed box to release accumulated solid matter collected therein.

11. In an apparatus for separating at least one component from a mixture, a driven shaft, sieve drums carried by said shaft radially spaced therefrom, means for rotating each of said sieve drums about its own axis, a feed box for each of said drums in engagement with and opening onto the outer surface thereof on the side adjacent said shaft, means for delivering the mixture to said feed boxes, means engaging the inner periphery of said drums adjacent said feed boxes for maintaining said drums in engagement with the boxes, a filtrate collecting receptacle disposed inside each of said drums directly opposite each of said feed boxes, each of said drums having a depressed portion in its outer peripheral surface extending substantially parallel to the axis thereof for receiving and carrying off accumulated solid matter from within said feed boxes, and an outlet from each of said collecting receptacles to a common discharge duct.

12. In an apparatus for separating at least one component from a mixture, a driven shaft, sieve drums carried by said shaft radially spaced therefrom, means for rotating each of said sieve drums about its own axis, a feed box for each of said drums in engagement with and opening onto the outer surface thereof on the side adjacent said shaft, means for delivering the mixture to said feed boxes, and a roller engaging the inner surface of the upper end of each of said drums to hold the latter in firm engagement with said feed boxes, said drums having a recessed portion in the path of said roller for periodically releasing the drums from engagement with the feed boxes to discharge accumulated solid matter from the latter.

ROBERT ADAMS.

CERTIFICATE OF CORRECTION.

Patent No. 2,061,340.　　　　　　　　　　　　　　　November 17, 1936.

ROBERT ADAMS.

It is hereby certified that the above numbered patent was erroneously issued to "Seitz-Werke G. M. B. H., of Rheinland, Germany whereas said patent should have been issued to Seitz-Werke G. M. B. H., Bad Kreuznach, Rheinland, Germany, a corporation, as assignee of the entire interest in said invention as shown by the record of assignments in this office; and that the said Letters Patent should be read with this correction therein that the same may conform to the record of the case in the Patent Office.

Signed and sealed this 1st day of June, A. D. 1937.

(Seal)　　　　　　　　　　　　　　　　　　　　　　Henry Van Arsdale
　　　　　　　　　　　　　　　　　　　　　Acting Commissioner of Patents.